Oct. 15, 1946. J. ROBINSON Re 22,804

JACQUARD COMPENSATING MEANS

Original Filed June 26, 1942 4 Sheets-Sheet 1

INVENTOR.
JONAS ROBINSON
BY
Oscar J. Geier
ATTORNEY

JACQUARD COMPENSATING MEANS

Original Filed June 26, 1942 4 Sheets-Sheet 2

INVENTOR.
JONAS ROBINSON
BY
Oscar A. Geier
ATTORNEY

JACQUARD COMPENSATING MEANS

Original Filed June 26, 1942 4 Sheets-Sheet 3

INVENTOR.
JONAS ROBINSON
BY Oscar G. Geier
ATTORNEY

JACQUARD COMPENSATING MEANS

Original Filed June 26, 1942 4 Sheets-Sheet 4

INVENTOR.
JONAS ROBINSON
BY
Oscar J. Geier
ATTORNEY

Reissued Oct. 15, 1946

Re. 22,804

UNITED STATES PATENT OFFICE 22,804

JACQUARD COMPENSATING MEANS

Jonas Robinson, Clarke Summit, Pa.

Original No. 2,386,574, dated October 9, 1945, Serial No. 448,527, June 26, 1942. Application for reissue December 29, 1945, Serial No. 638,499

10 Claims. (Cl. 87—14)

This invention relates to pattern-controlling means and refers more particularly to means connecting a Jacquard with heddles, jacks, pickers or other thread-controlling elements of a loom or textile machine.

As is well known, Jacquards are utilized for the selective operation of heddles carrying the warp-threads in the case of a loom or the corresponding jacks or pickers in case of a curtain machine or Nottingham lace machine, to determine the pattern of fabric produced on the loom or machine. For that purpose, the heddles or jacks are all individually connected by a series of strings or cords with the lifters, hooks or needles of the Jacquard. The number of strings is equal to that of the heddles or jacks and is quite great. The Jacquard is mounted, of necessity, high above the loom or machine frame, the length of the strings or cords extending between the Jacquard and the heddles or jacks being often from 16 to 25 feet.

It was found that these very long strings and cords are affected to a great extent by variable atmospheric conditions. A string may extend to such extent that the operation of the Jacquard will not result in the withdrawal of a jack or heddle, or a string may contract so much that the jack or heddle will remain withdrawn despite the operations of the Jacquard. Constant attention and frequent adjustments are necessary to ensure good work being produced.

It is among the important objects of the present invention to provide a device automatically compensating for the extension or contraction of the aforesaid strings and cords.

Another object is to provide a compensating device which will ensure proper operation of the heddles and jacks by a Jacquard irrespective of the contraction or extension of the connecting strings and cords.

A further object is to eliminate the necessity for constant attention and frequent adjustments of the Jacquard-connecting means through the provision of automatically operable compensating means interposed between the Jacquard and the elements operated thereby.

Other objects of the present invention will become apparent in the course of the following specification.

In accomplishing the objects of the present invention it was found desirable to insert into the length of each connecting string and fairly close to the loom or machine an element which is capable of carrying out a movement which is different from the movement of the string actuated by the Jacquard, the string movement and said different movement of the element being so combined and/or correlated that as soon as action is transmitted by the Jacquard, the element will be able to manipulate its jack or heddle in the required manner irrespective of any extensions or contractions of the string.

According to some of the preferred embodiments of the inventive idea, the element, which may have the form of a plate, may carry out a pulling movement, as well as a swinging movement. The swinging movement may be produced by an external force and may be transmitted to the jack or heddle; in that case the pulling movement is the one received by the element from the string. On the other hand, the swinging movement may be caused by a guide forming a part of the plate and may constitute a component of the string movement, while another component is transmitted by the plate to the jack or heddle; this construction is suitable for compensating solely for the extensions or expansions of a string and may be used for varying the lift of a jack or heddle and/or operating a jack or heddle from a plurality of Jacquards.

The invention will appear more clearly from the following detailed description when taken in connection with the accompanying drawings showing, by way of example only, some of the preferred embodiments of the inventive idea.

Figure 1:
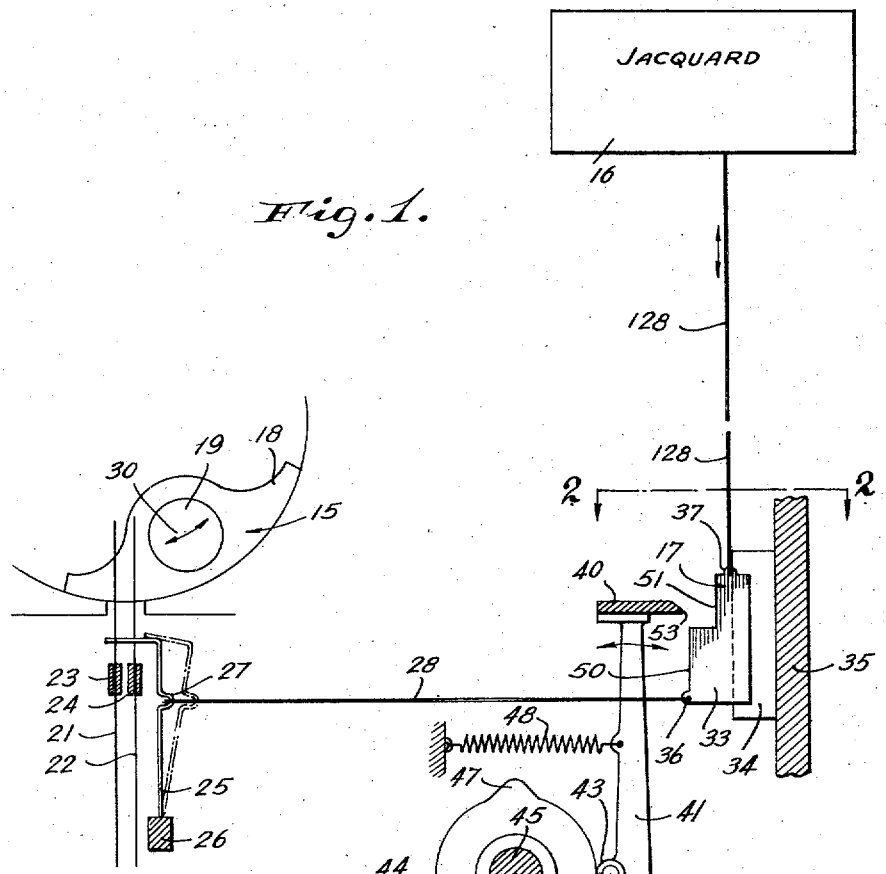
Figure 1 is a diagrammatic side view illustrating the use of pattern-controlling means which are constructed in accordance with the present invention, in a Nottingham lace curtain machine.

Figure 1 of the drawings illustrates diagrammatically a Nottingham lace curtain machine 15, a Jacquard 16 and a compensating or equalizing device 17.

While Nottingham lace curtain machines are shown in the drawings in conjunction with the compensating devices, such devices may be conveniently used with any other type of textile machine, such as a loom or a curtain machine of any type.

Figure 7:
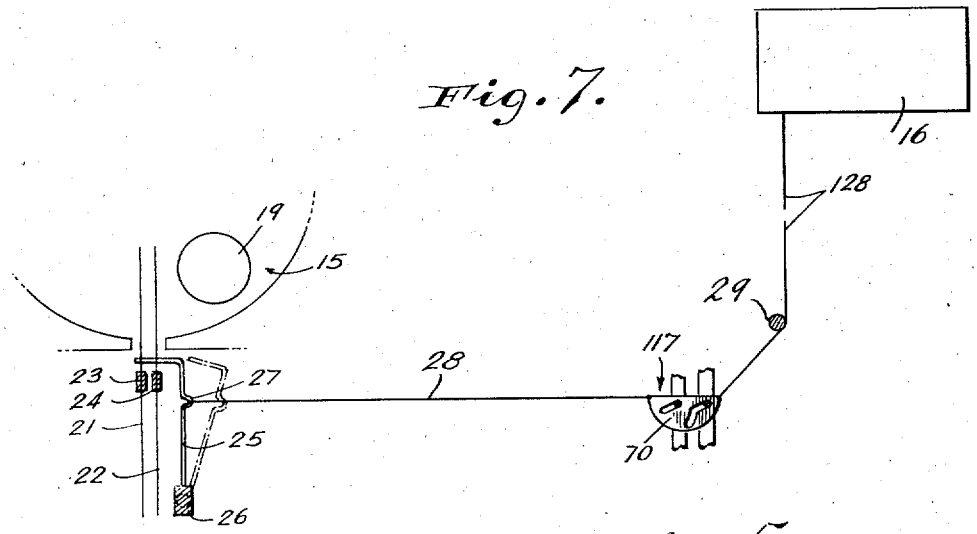
Figure 7 is a diagrammatic side view illustrating the combination of a Nottingham lace curtain machine with compensating or equalizing means of a different type.

The Nottingham lace curtain machine 15 is of standard construction and is shown merely in the form of a diagram in Figures 1 and 7.

Figure 5:
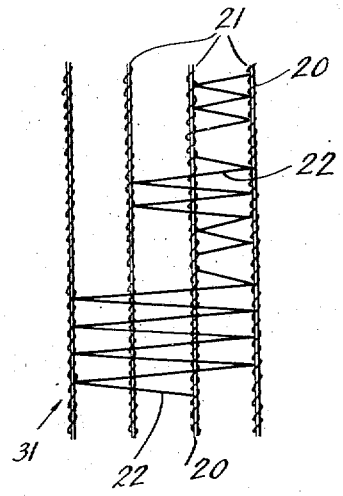
Figure 5 is a diagram illustrating a fabric made on the Nottingham lace curtain machine.
Figure 4:
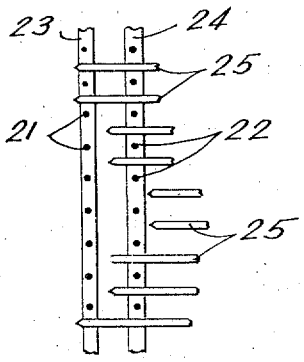
Figure 4 is a diagrammatic top view of a part of the Nottingham lace machine, illustrating the operating of the jacks.

The machine comprises carriages 18 carrying disc-like bobbins 19. Bobbins 19 carry tying threads 20 (Fig. 5) and are thrown between warp threads 21 and spool or patterning threads 22. Warp threads 21 extend through uniformly spaced openings of a warp bar or guide bar 23, while spool threads 22 extend through similar openings of a spool bar or guide bar 24. Jacks 25 are carried by a jack bar 26 and are adapted to project between a pair of warp and spool threads (Fig. 4). Each jack 25 is provided with a curved portion 27 to which an end of a string 28 is attached.

In prior art, strings 28 extended over sley bars 29 (Fig. 7) directly to a Jacquard 16.

In operation, bobbins 19 reciprocate in the direction of the arrow 30 (Fig. 1) by being thrown between the separated threads, while the bars 23 and 24 reciprocate in the direction of their lengths. The jack bar 26 carries out a reciprocatory turning movement and moves the jacks 25 to the withdrawn position shown by broken lines in Figures 1 and 7. At that time some of the needles of the Jacquard 16 are operated.

As already stated, in prior art the strings 28 were directly actuated by the Jacquard needles, which pulled them taut. Therefore, when the jack bar 26 moved back to the normal position indicated by full lines in the drawings, some of the resilient jacks 25 were maintained in the withdrawn broken-line position by their taut strings 28, and remained out of engagement with the threads 21 and 22 during the movement of the bars 23 and 24, until the Jacquard needles released the strings and the resilient jackets sprang back to their normal position.

The pattern of a fabric 31 (Figure 5) depends upon the positions of the jacks 25 in relation to the threads 21 and 22, said positions being determined by the needles of the Jacquard 16 and the strings 28 operated thereby. As indicated in Figure 4, strings 28 may maintain the jacks 25 in a full lift position, or a half-lift position in which the tip of a jack is located between the two bars.

The described operation of a Nottingham lace curtain machine is well known and does not constitute a part of the present invention which is concerned with means transmitting the movement of the needles of a Jacquard 16 through the strings 28 for the purpose of maintaining some of the jacks 25 in the withdrawn positions.

As already stated, the strings between the Jacquard and the packs may be as long as 20 or 25 feet, while the full path of movement of the upper end of a jack for a full lift is about one inch. It is apparent that variations in atmospheric humidity will cause the strings to contract or expand. If the strings contract too much, they may prevent the jacks from assuming their normal forward position, so that the jacks will remain in the half lift or full lift positions despite the release of the strings by the needles of the Jacquard. On the other hand, if the strings expand too much, a jack may be returned to a half lift or forward position despite the movement of the corresponding needle of the Jacquard to the full lift position.

Figure 3:
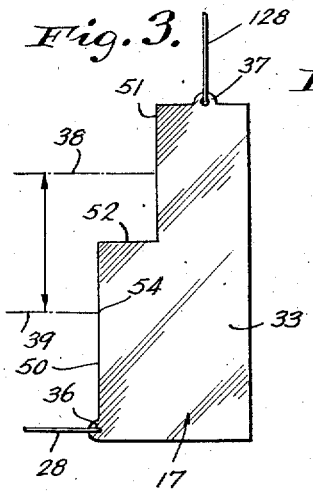
Figure 3 shows a compensating plate in side elevation.
Figure 2:
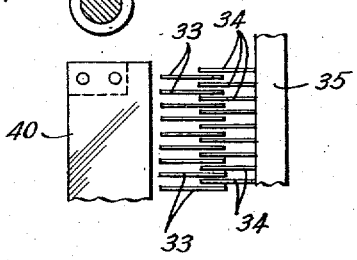
Figure 2 is a partial top view along the line 2—2 of Figure 1.

In accordance with the present invention, the expansion and contraction of the strings may be compensated by a compensator or equalizer 17 (Figures 1, 2 and 3).

The compensator 17 comprises a plurality of plates 33, the number of the plates being equal to that of the jacks. Each plate 33 is attached by a separate string 38 to a separate jack 25. The plates 33 extend in vertical rows and are separated from each other by partitions 34 which are attached to a wall 35. The strings 28 are attached to ears 36 situated at the bottom of the plates 33. The forward edge of the plate 33, which faces the machine 15, consists of a vertical bottom portion 50 and an upper vertical portion 51 joined by a horizontal portion 52, the plate being wider at the bottom than at the top.

Each plate 33 is connected at 37 by a separate string 128 with a separate actuating needle (not shown) of the Jacquard 16. The strings 128 extend upwardly and are very long, while the strings 28 are quite short and extend substantially horizontally.

It is thus apparent that according to the present invention, the single string of prior art constructions is separated close to the textile machine into two strings 28 and 128 and a compensating plate is connected to both strings. Thus the pulling force is separated into two smaller pulling forces.

The Jacquard needle exerts an upward pull upon the string 128 and the plate 33 connected therewith. When the string 128 is of normal length, the extent of the upward movement of the plate 33 is represented by the distance between the lines 38 and 39 in Figure 3. As already stated, this upward movement of the string 128 and of the plate 33 is caused by a Jacquard needle when for pattern purposes the corresponding jack 25 should be retained in the rearward or lift position.

The upward movement of a plate 33 is transmitted to the corresponding string 28 by an oscillatory mechanism comprising an elongated shogging bar 40 which is carried by levers 41 mounted upon a pivot 42. The levers 41 carry cam followers 43 engaging cam 44 which are rotatable along with a driving shaft 45 and which are provided with circular surfaces 46 and projections 47. Springs 48 maintain the cam followers 43 in engagement with the cams 44.

It is apparent that when a projection 47 engages the cam follower 43, the lever 41 is swung toward the plate 33. As soon as the projection 47 is moved beyond the cam follower, the spring 48 pulls back the lever 41, so that the lever 41 and the bar 40 connected therewith carry out an oscillatory or swinging movement.

The length of movement of the bar 40 depends upon the size of the projections 47, and the latter are so dimensioned, that when a plate 33 is in its lower-most position of rest, the tip 53 of the bar 40 moves not far from the line 38 of Figure 3 and in its extreme forward position is situated beyond an extension of the line 50 but at a distance from the edge 51.

When a plate 33 is pulled upwardly by a string 128, the tip 53 of the bar 40 will move in the vicinity of the line 39 of Figure 3 and will strike the plate 33 at about the point 54 of the edge 50, since the edge 50 is further forward than the edge 51.

The bar 40 will swing the plate 33 and at first one edge of the plate 33 will engage the wall 35, whereupon the plate 33 will be pressed in its entirety against the wall 35. Obviously, the string 28 will be stretched taut during this movement of the plate 33 and if at that time the jack bar 26 swings forward, the string 28 will retain its jack 25 in the withdrawn position.

The position of the cam 44 and the speed of its rotation are so selected that the time interval during which the bar 40 exerts it pressure against the edge 50 of a plate 33 coincides approximately with the time period during which the corresponding needle of the Jacquard 16 exerts it pulling force upon the string 128, these time periods being sufficient to maintain the jack 25 out of engagement with the threads 21 and 22 during a back-and-forth movement of the bars 23 and 24.

If atmospheric conditions or other circumstances cause an expansion or extension of the long string 128, then this string will be more slack between the Jacquard 16 and the plate 33, and the plate 33 will hang lower. Then the point of contact between the tip 53 of the bar 40 and the edge 50 of the plate 33 in the full lift position of the plate will be shifted upwardly from the normal location 54 and toward the edge 52. However, so long as the tip 53 can strike the edge 50, the expansion of the string 128 will not influence the action of the plate 33 upon the string 28 and the jack connected therewith.

If the string 128 is contracted by atmospheric conditions, the plate 33 will move upwardly, but its operation will not be affected so long as the tip 53 of the bar 40 can swing above the edge 52 in the non-litfing position of the plate.

Figure 6:
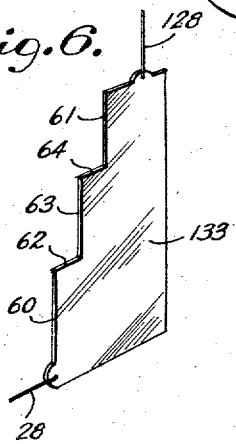
Figure 6 is a perspective view of a somewhat different compensating plate.

Figure 6 shows a plate 133 which may be used to maintain the jack connected thereto not only in the non-lifting and full lift positions, but in the half lift position as well. For that purpose, the front edge of the plate 133 has three vertical portions 60, 63 and 61 and two horizontal portions 62 and 64. The jack remains in the non-lifting forward position so long as the shogging bar moves above the horizontal edge 64. The jack is maintained in a half lift position when the plate is somewhat moved by the shogging bar after the bar engages the edge 63. The jack is maintained in its full lift position when the plate is moved to its full extent by the shogging bar which engages the edge 60 of the plate.

It is apparent that the string 128 may expand or contract within wide limits without interfering with the action of the plate 133.

It was found that normal atmospheric variations may cause a variation of up to one inch in the length of a spring 128, the operative extent of which may range between 16 and 20 feet. The plates 33 and 133 must be constructed so as to be able to compensate for this variation.

Figure 8:
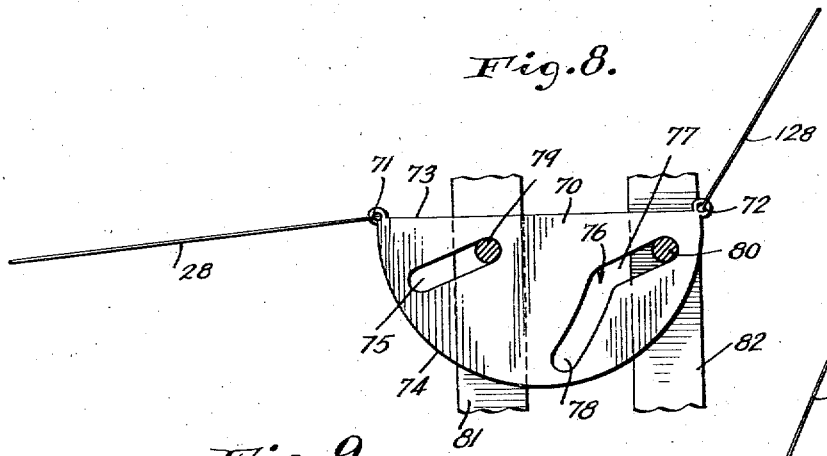
Figure 8 is a section showing on a larger scale the compensating means illustrated in Figure 7.

Figures 7 to 10 show a different compensating device 117 connected to strings 28 and 128 which extend between a Nottingham lace machine 15 and a Jacquard 16. The compensating device 117 includes a plurality of plates 70, each plate being connected to separate strings 28 and 128 at 71 and 72, respectively (Fig. 8). Each plate has the form of a semi-circle with an upper straight edge 73 and a lower curved edge 74. A front slot 75 formed in the plate extends at a fairly acute angle to the edge 73. A rear slot 76 consists of a rear part 77 extending at about the same angle as the slot 75 and of a front part 78 forming a much greater angle with the edge 73 and having slightly curved edges.

Plates 70 hang upon two rods 79 and 80. The rod 79 is mounted in a support 81 and extends through the slots 75. The rod 80 is mounted in a support 82 and extends through the slots 76.

When the Jacquard 16 does not exert a pulling action upon a string 128, its plate 70 is situated in its non-lifting position shown in Figure 8. When a Jacquard needle begins to pull the string 128 upwardly, the plate 70 will move along with it. The initial direction of movement of the plate 70 is determined by the direction of the slot 75 and of the rear part 77 of the slot 76. When the rod 80 is located in the front part 78 of the slot 76, further pulling movement of the string 128 will cause the plate 70 to swing upwardly, until the end of the pulling movement is reached or until the rod 80 strikes the lower end of the front part 78 of the slot 76.

Figure 9:
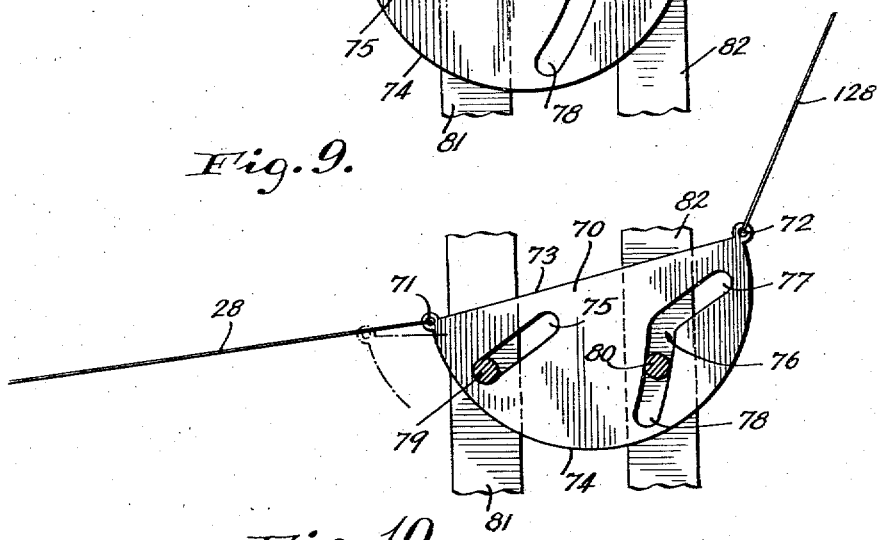
Figure 9 is similar to Figure 8 and shows the compensating means in a different position.
Figure 10:
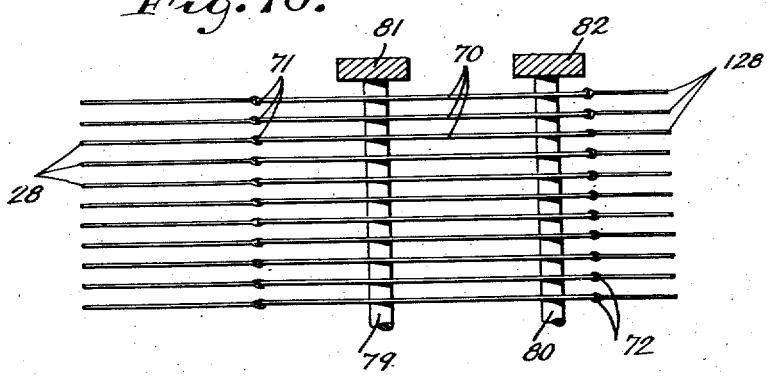
Figure 10 is a top view of the compensating means.

Thus the plate 70 also separates the pulling movement of the Jacquard needle into two movements, only one of which is transmitted to the string 28. The extent of the pulling movement to which the string 28 is subjected, is shown in Figure 9 by the distance between the ear 71 in its non-lifting position shown by broken lines, and its full lift position shown in full lines.

This device is preferably installed in conditions of maximum humidity in the plant, since it is more suitable as a compensator for the expansion or extension of the strings 128. When a string 128 expands, it will hang slack between the Jacquard 16 and the plate 70, so that a part of the pulling movement of the Jacquard needle will be absorbed in pulling the string 128 taut. Only the remaining part of this pulling movement will be transmitted to the plate 70. However, so long as this remaining part is sufficient to shift the rod 80 into the forward part 78 of the slot 76 the string 28 will be actuated to the required extent.

Thus in this construction a diminution of the pulling movement upon the plate 70 resulting from an extension of its string 128, results in the diminution of the turning motion of the plate 70, while the operative movement of the plate 70 which is transmitted to the string 28, need not be affected by the extension of the string 128.

Figure 11:
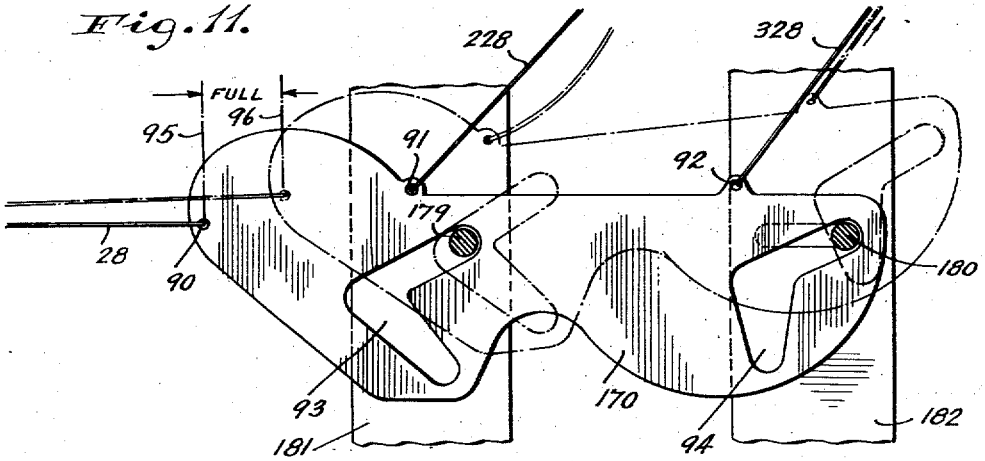
Figure 11 shows a differently constructed compensating device which is actuated by two Jacquards.
Figure 12:
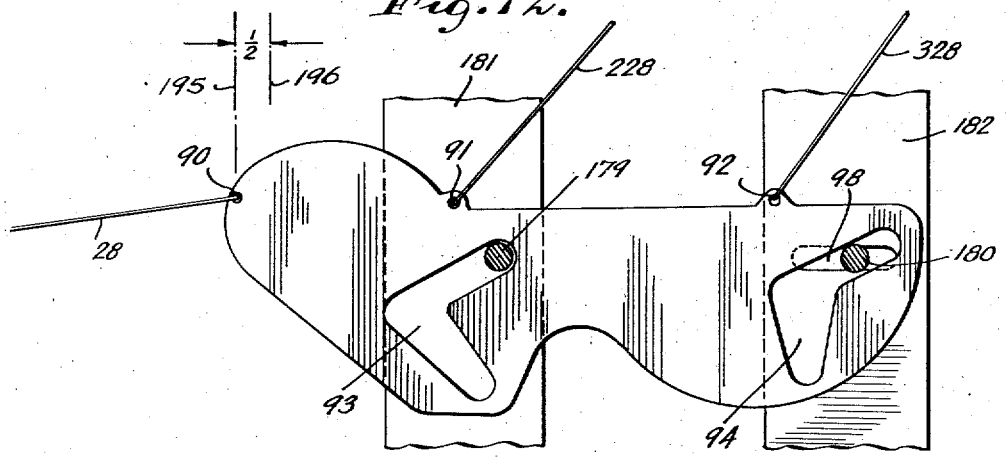
Figure 12 shows the compensating device of Figure 11 when it is differently adjusted.
Figure 13:
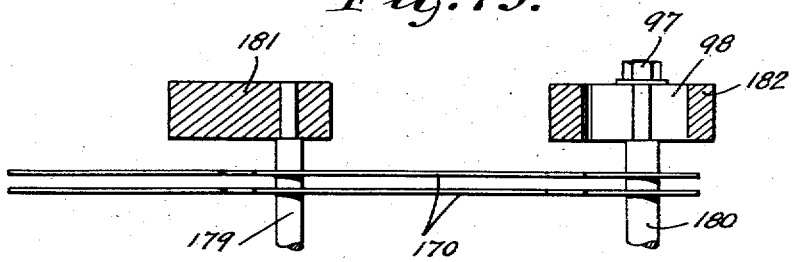
Figure 13 is a top view of the compensating device shown in Figure 12.

A single jack may be connected with two separate Jacquards by a construction shown in Figures 11 to 13. Each jack string 28 is connected at 90 to a plate 170 which is connected at 91 to a string 228 leading to one Jacquard, and which is connected at 92 to a string 328 leading to another Jacquard. The plates 170 are supported by two rods 179 and 180 extending through slots 93 and 94, respectively. Both slots 93 and 94 are substantially angular in form with a very wide apex portion, so as to enable proper movement of the plate 170. The rod 179 is carried by a support 181, while the rod 180 is adjustably held by a nut 97 in a horizontal slot 98 provided in a support 182.

The plate 170 is operated in substantially the same manner as the plate 70, a full lift position of the plate 170 being shown by broken lines in Figure 11, while the non-lifting position is shown in full lines. The distance between lines 95 and 96 in Figure 11 shows the length of the pulling movement upon the string 28.

This device may be conveniently set to provide for a full lift or a half lift of the jacks. In the non-lifting position shown in full lines in Figure 11, the rod 180 is situated in the extreme rear end of the slot 98, provided in the support 182. Then both Jacquards may operate at full lift. In order to provide for a half lift, the rod 180 is moved to a position substantially in the middle of the slot 98 of the support 182. Then the rod 180 will also extend approximately through the middle of the upper part of the slot 94. As stated in connection with plate 70, the relative movement between the upper part of the slot 94 of the plate 170 and the rod 180 is that portion of the pulling movement of the string 328 which is transmitted to the string 28. When the rod 180 is close to the end of the upper part of the slot 94 in the non-lifting position of the plate 170, as shown in full lines in Figure 11, then the relative movement between the upper part of the slot 94 and the rod 180 will cover the entire length of this upper part, resulting in a full lift pulling movement upon the string 28, as indicated by the distance between the lines 95 and 96 in Figure 11.

On the other hand when the rod 180 is in the middle of the upper part of the slot 94 in the non-lifting position of the plate 170, as shown in Figure 12, then the relative movement between the upper part of the slot 94 and the rod 180 will extend over only one half of this upper part and the balance of the pulling movement of the Jacquard needle will be transformed into a turning movement of the plate 170. Thus the pulling movement transmitted by the plate 170 to the string 28 will be reduced to about one half, as designated by the distance between lines 195 and 196 in Figure 12.

It is apparent that according to this construction the adjustment from full lift to half lift and vice versa is carried out solely by the compensating device, so that a needle of a Jacquard may continue to transmit a full lift pulling movement to its string, while only a half lift pulling movement is transmitted to the string which is attached to the jack.

It is apparent that the specific illustrations shown above have been given by way of illustration and not by way of limitation and that the described methods and devices are subject to wide variation and modification, without departing from the scope or intent of the present invention; all of such variations and modifications are to be included within the scope of the present invention.

What is claimed is:

1. In combination with a textile machine of the type having a plurality of thread-actuating elements and a Jacquard having pulling elements for operating said thread-actuating elements, and elongated connecting elements having ends attached to said pulling elements; a device for compensating for the expansion and contraction of said connecting elements, said device comprising other connecting elements connected to said thread-actuating elements and means connecting the first-mentioned connecting elements with the second-mentioned connecting elements and substituting a pulling force transmitted by a pulling element to a first-mentioned connecting element by a smaller pulling force transmitted by a second-mentioned connecting element to a thread-actuating element, and by another force which is not transmitted to the second-mentioned connecting element and which may compensate for an extension or contraction of the first-mentioned connecting elements.

2. In a device connecting a pulling element of a Jacquard with a thread-actuating element of a textile machine, an elongated connecting element having one end connected to said pulling element, another connecting element having one end connected to said thread-actuating element, and means interposed between the other ends of the two connecting elements for substituting a pulling force transmitted by said pulling element to the first-mentioned connecting element by a smaller pulling force transmitted by the second-mentioned connecting element to said thread-actuating element, and by another force which is not transmitted to the second-mentioned connecting element and which may compensate for an extension or contraction of the first-mentioned connecting elements.

3. A device for compensating for the extension and contraction of an elongated connecting element extending between an actuating element and an actuated element, said device comprising means receiving a pulling force transmitted by said elongated connecting element from said actuating element, means transmitting a smaller pulling force to said actuated element, and means carrying out a movement which is not transmitted to said actuated element and which may compensate for an extension or contraction of said connecting element.

4. In combination with a textile machine of the type having a plurality of thread-actuating elements and a Jacquard having pulling elements for operating said thread-actuating elements, and elongated connecting elements having ends attached to said pulling elements; a device for compensating for the expansion of said connecting elements, said device comprising a plurality of compensating elements connected to the other ends of said connecting elements, and other connecting elements connecting said compensating elements with said thread-actuating elements; said compensating elements comprising means separating a pulling movement transmitted by a pulling element and a first-mentioned connecting element into a smaller pulling movement transmitted to a second-mentioned connecting element, and another movement of a compensating element which is not transformed into a pulling movement of the second-mentioned connecting element.

5. In a device connecting a pulling element of a Jacquard with a thread-actuating element of a textile machine, an elongated connecting element having one end connected to said pulling element, another connecting element having one end connected to said thread-actuating element, and means interposed between the other ends of the two connecting elements for separating a pulling force transmitted by said pulling element to the first-mentioned connecting element into a smaller pulling force transmitted by the second-mentioned connecting element to said thread-actuating element, and into a movement which is directed substantially at right angles to said smaller pulling force, which is not transmitted to the second-mentioned connecting element and which may compensate for an extension of the first-mentioned element.

6. A device for compensating for the extension of an elongated connecting element extending between an actuating element and an actuated element, said device comprising a plate receiving a movement of the actuating element and the connecting element, and means actuated by said movement to transmit a force to said actuated element, said plate comprising means actuated by said movement to turn said plate, whereby said turning movement of the plate is not transmitted to the actuated element and may compensate for an extension of said connecting element.

7. A device for compensating for the extension of an elongated connecting element extending between an actuating element and an actuated element, said device comprising another connecting element connected to the actuated element and a plate connected to the two connecting elements and having at least one slot portion formed therein for transforming a part of a pulling movement of said actuating element and the first-mentioned connecting element into a smaller pulling movement of the second-mentioned connecting element, and another slot portion formed therein for transforming the other part of the first-mentioned pulling movement into a turning movement of the plate, whereby said turning movement of the plate is not transmitted to the actuated element and may compensate for an extension of the first-mentioned connecting element.

8. In combination with a textile machine of the type having a plurality of thread-actuating elements and a Jacquard having pulling elements for operating said thread-actuating elements, and elongated connecting elements having ends attached to said pulling elements; a device for compensating for the expansion of said connecting elements, said device comprising a plurality of plates connected to the other ends of said connecting elements, and other connecting elements connecting said plates with said thread-actuating elements; each of said plates comprising a substantially straight slot formed therein and situated comparatively close to the second-mentioned connecting elements, and a substantially angular slot formed in the plate and situated comparatively close to the first-mentioned connecting elements, said angular slot having a part extending substantially parallel to the first-mentioned slot and another part extending approximately at a right angle to the direction of the second-mentioned connecting elements; and rods extending through said slots and carrying said plates.

9. In combination with a textile machine of the type having a plurality of thread-actuating elements and at least one Jacquard having pulling elements for operating said thread-actuating elements, and elongated connecting elements having ends attached to said pulling elements; a device for compensating for the expansion of said connecting elements, said device comprising a plurality of plates connected to the other ends of said connecting elements, and other connecting elements connecting said plates with said thread-actuating elements; each of said plates comprising a forward slot formed therein and situated comparatively close to the second-mentioned connecting elements, and a rear slot formed in the plate and situated comparatively close to the first-mentioned connecting elements, at least said rear slot being angular and having a lower part extending approximately at a right angle to the direction of the second-mentioned connecting elements, and an upper part forming an angle with said lower part, said forward slot having a part extending substantially parallel to the upper part of said rear slot; a rod extending through said forward slots, another rod adapted to extend through the upper parts of the rear slots in the inoperative position of the plates, and means for adjusting the location of the second-mentioned rod in said upper parts in said inoperative position to vary the extent of movement transmitted to the thread-actuating elements.

10. In combination with a textile machine of the type having a plurality of thread-actuating elements and two Jacquards having pulling elements for operating said thread-actuating elements, and elongated connecting elements having ends attached to said pulling elements; a device for compensating for the expansion of said connecting elements; said device comprising a plurality of plates connected to the other ends of said connecting elements, each plate being connected to two connecting elements connected to pulling elements of different Jacquards, and other connecting elements connecting said plates with said thread-actuating elements, each of said plates comprising a forward slot and a rear slot formed therein, said slots being angular and having upper parts enabling a movement of the plates in the direction of the second-mentioned connecting elements, and lower parts enabling a movement of the plates at a substantially right angle to the direction of the second-mentioned connecting elements, and rods extending through said slots and carrying said plates.

JONAS ROBINSON.